Patented Oct. 13, 1953

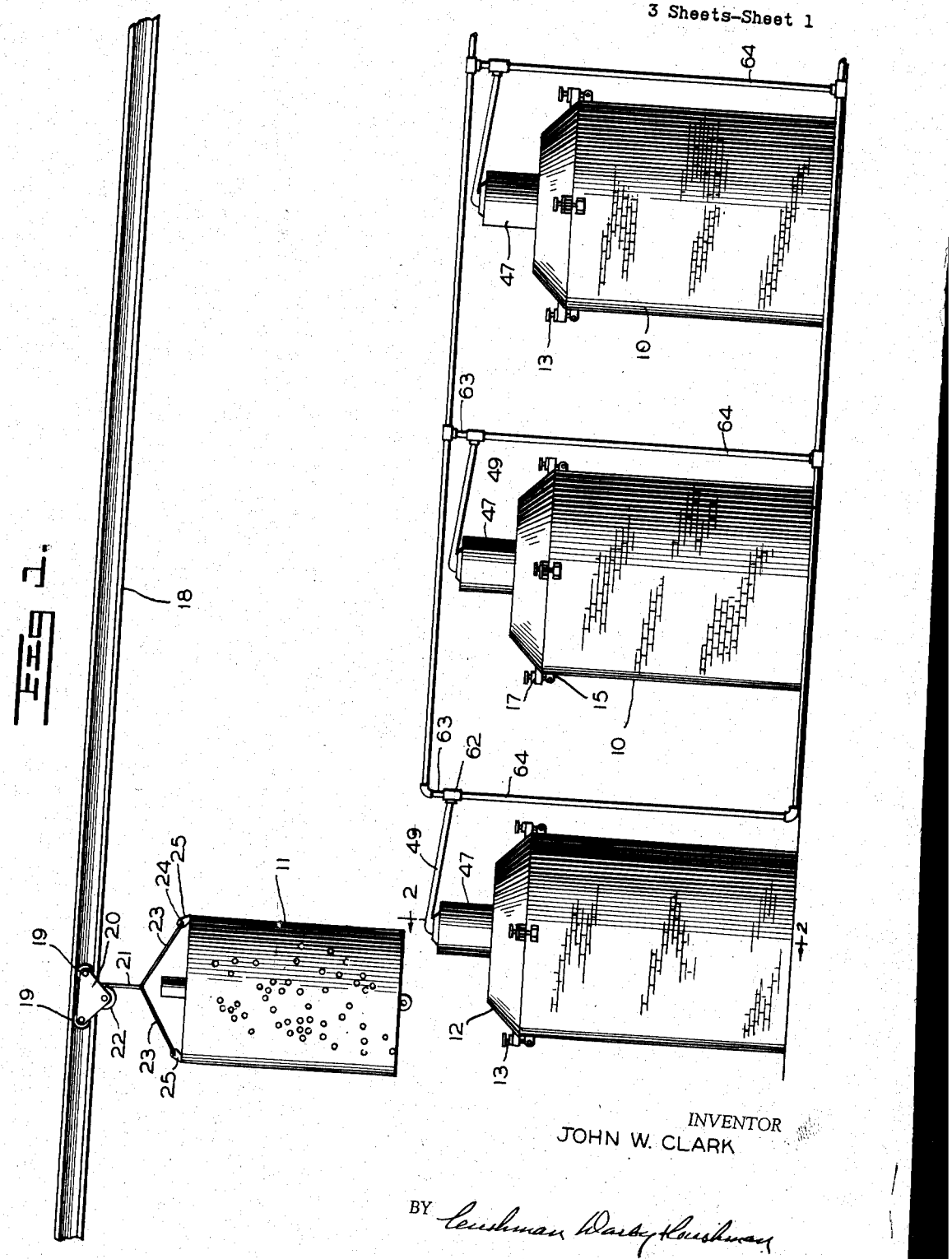

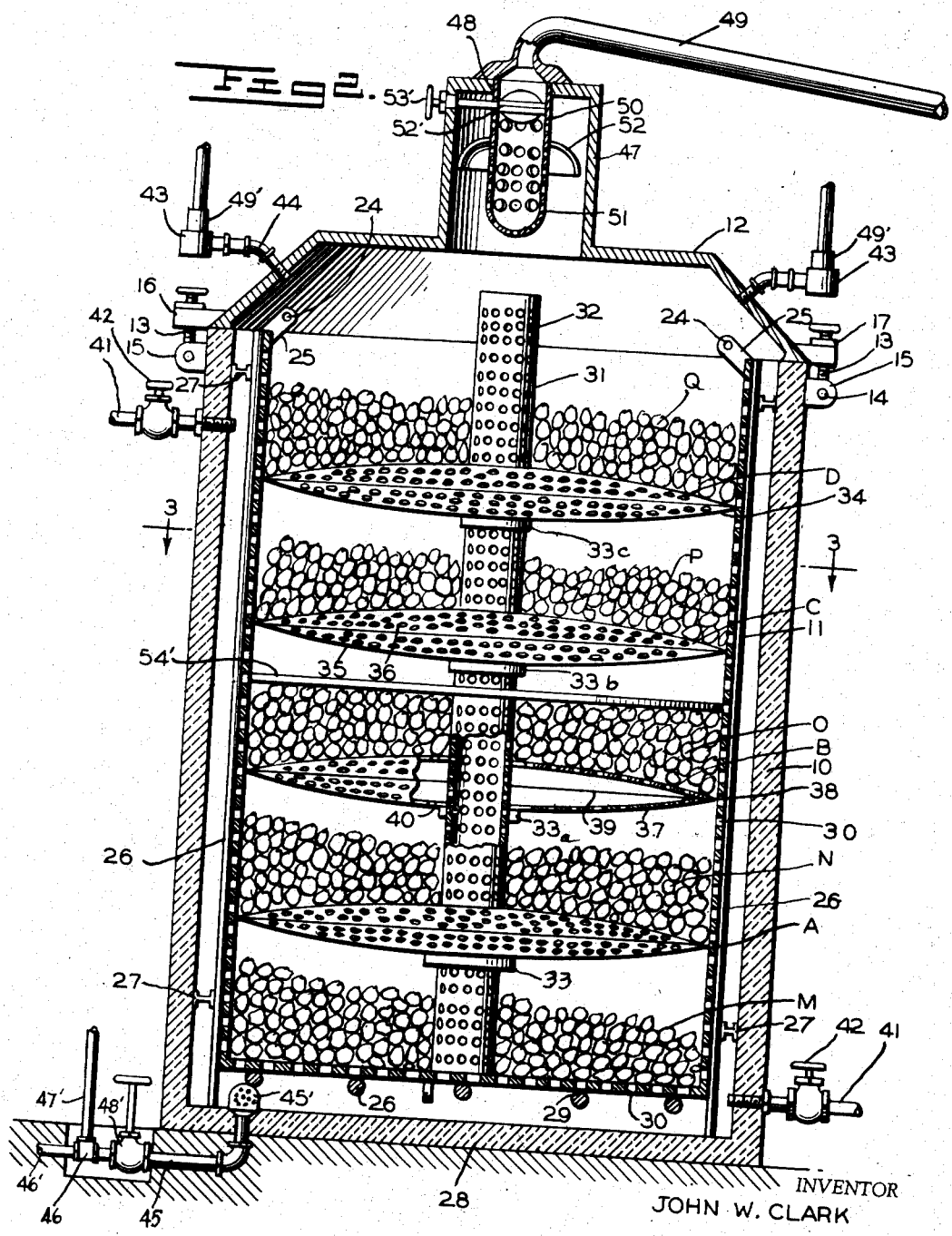

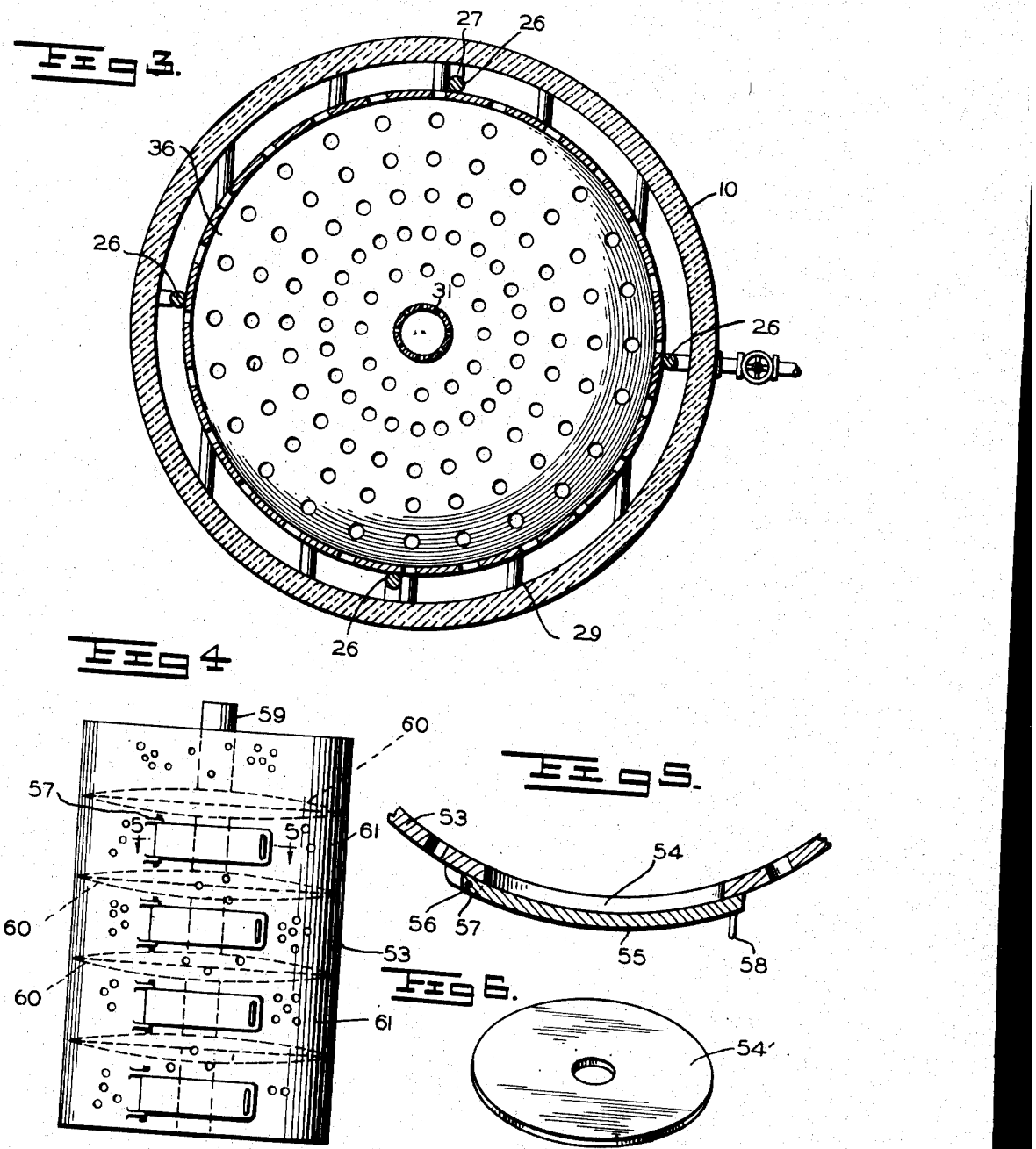

2,655,470

UNITED STATES PATENT OFFICE 2,655,470

APPARATUS FOR TREATING CARBONACEOUS MATERIAL

John W. Clark, Washington, D. C.

Application January 23, 1951, Serial No. 207,251

12 Claims. (Cl. 202—99)

The present invention relates to a new and improved apparatus and process for treating carbonaceous material such as coal or the like to obtain solid, liquid, oil, tar, gaseous, and other by-products therefrom.

An important object is to provide an improved apparatus and process for localizing small batches of carbonaceous material by placing the batches in individualized compartments during the treating operation, in order to obtain a uniform and equalized treatment of the carbonaceous materials down to the small units of the material, irrespective of whether the heating is done by steam, gas or vaporized chemicals which later may be followed by the application of a cooling treatment. Suitable means are provided for controlling expansion of the carbonaceous materials which have a tendency to expand when subjected to heat under certain conditions.

A further object consists in associating with a retort, a perforated container in which is mounted the solid carbonaceous material to be treated or heated, and in which means are provided for separating the material in the container into batches in such a manner as to insure localizing the treatment or heating and expansion of the solid carbonaceous material, such as coking-coal, as the same becomes heated above certain predetermined temperatures. This treatment and expansion is localized by separating the container into vertically disposed compartments into which batches of the carbonaceous material are introduced by not filling each compartment to its maximum capacity. The arrangement of the material in the compartments insures a thorough penetration by the heating medium, such as superheated steam, with the carbonaceous material and facilitates the liberation of the evolved gases and the withdrawal of the vaporized oils, gases and steam from the retort.

Another object comprehends the provision of means for allowing the withdrawal of the vaporized oils, gases and steam from the top of the retort while preventing the clogging of the outlet by any solid material.

A further object consists in removably mounting in each of the perforated containers, a centrally and vertically disposed tubular shaft having openings therein, and mounting on the shaft axially spaced partition members preferably in the form of perforated discs that divide the container into separate compartments. The discs may be removably mounted within the container and axially slidable on the tubular shaft in a predetermined order, so that as each batch of carbonaceous material is introduced into the container, it will be separated from the adjacent batch by a disc which is spaced therefrom but which constitutes a support for the batch of material above the previously introduced batch. Each of the discs is preferably made of two perforated parts of concaved or cupped shape which face each so as to form a space between them to provide a chamber that allows the free circulation of steam, gas, vapor or air through the coal or other carbonaceous material during the treatment of the material.

A still further object consists in positioning in each compartment, when expansible solid carbonaceous materials are being processed, a solid disc or ponderous member of such size, shape and weight as may be found to be preferable, to rest on the top of the raw material therein, so as to provide a compact and dense solid fuel after the carbonaceous material has been processed for the removal of the oils, vapors and gases.

A further object is to provide a process for treating solid carbonaceous material in a perforated container, which includes dividing the container into separate compartments, partially filling the compartments with batches of the carbonaceous material, and introducing a heating medium into the container so as to contact and penetrate the material therein. The batches of material are spaced from each other so as to provide means for localizing treatment and expansion of solid products.

A further object consists in providing an improved process of manufacturing combustible gases from carbonaceous fuels in a gas retort having a perforated container, which includes introducing a predetermined charge of carbonaceous material into the container, positioning a partitioning member within the container and spaced from the material initially introduced therein, so as to localize treatment and expansion of the solid carbonaceous material by reason of the fact that each compartment formed in the container by the partitioning members is not filled to its maximum capacity, and thus allows a better penetration by the heating medium through the solid products being treated. When the desired number of separate batches of material are introduced into the container and separated from each other by the vertically spaced partitioning members, and placed in the retort, the retort is closed and a suitable heating medium, such as superheated steam, is forced into the retort so as to circulate through the carbonaceous material in the container. The evolved gases and vaporized oils are then withdrawn from the top of the retort and the unvaporized oils and other liquids discharged through an outlet and drain valve in the bottom of the retort.

Other objects and advantages of the invention will become apparent from the following description when taken in conjunction with the accompanying claims and drawings.

Referring to the drawings wherein, for illustrative purposes, is shown one form of apparatus for processing and treating solid carbonaceous material:

Figure 1 is a side view of a battery of retorts constructed in accordance with the present invention and showing means for conducting a container to a retort so that it may be properly positioned therein during the treatment of the carbonaceous material.

Figure 2 is a vertical sectional view taken substantially along the line 2—2 of Figure 1 showing a retort, a removable perforated container, and their associated parts constructed in accordance with the present invention.

Figure 3 is a sectional view taken substantially along the line 3—3 of Figure 2.

Figure 4 is a detail side view of a modified form of retort and means for introducing the carbonaceous material into the perforated container and between the partitioning means.

Figure 5 is an enlarged sectional view taken substantially along the line 5—5 of Figure 4, and Figure 6 is a detail perspective view of the weighted disc which may be associated with the material in each compartment.

Referring particularly to Figure 1, there is shown for the purpose of illustration, a plurality of heating retorts 10 constructed in accordance with the present invention, and arranged to constitute a battery of spaced retorts for receiving the material to be treated. Each retort receives a container 11 and is closed by a detachable cover 12 clamped to the upper opened end of the retort in any suitable manner, such as by the threaded bolts or pins 13 which are pivoted as at 14 to lugs 15 extending outwardly from the retort 10 and which are arranged to be swung upwardly between the arms of bifurcated members 16 and clamped thereto by the nuts 17 threaded to the bolts 13. A longitudinally disposed track 18 positioned above the retorts 10, is arranged to receive the guide rollers 19 of the portable carriage 20. A cable 21 passes over a pulley 22 on the carriage and is provided with diverging spaced hooked arms 23 arranged to detachably engage in the openings 24 of the spaced lugs 25 on the container 11 (Fig. 2) so as initially to be positioned within one of the retorts 10 and receive the carbonaceous material to be treated. When the treating operation is completed, the container with the residual products therein, is removed from the retort and conducted to a point of discharge by the carriage 20.

Within each of the retorts 10 are circumferentially spaced vertically disposed guide rods 26 (Fig. 3) which are connected to brackets or bars 27 that extend inwardly from the retort so as to constitute guide means for properly positioning the container 11 within the retort and for removing the same therefrom. Also, spaced from the bottom 28 of the retort (Fig. 2) are transversely disposed rods 29 that receive and support the container 11 when the latter is positioned within the retort. The rods 26 and 29 insure the container being properly spaced from the bottom and sides of the retort so as to allow the free circulation of the treating medium during the operation of the apparatus. The container 11 may be formed of any suitable heat resisting sheet material and is provided with perforations or holes 30 in the bottom and sides thereof which are of such size as to permit the free circulation of the treating medium but prevent the solid particles of material within the container from escaping into the retort.

Disposed vertically and centrally within the container 11 is a removable tubular member or shaft 31 provided with perforations 32. The tubular member 31 extends from the bottom of the container preferably to a point above the same, and has on its outer side axially spaced shoulders 33, 33a, 33b and 33c which taper in width so that the upper shoulder will be of less width than the bottom shoulder, for a purpose subsequently to be described. Arranged to be removably mounted on the tubular member 31 and supported by the spaced shoulders, are one or more partitioning members 34, each of which is preferably in the form of a disc of a diameter slightly less than the inner cylindrical wall of the container 11, and which may be made of any suitable material such as heat-durable, thin sheet metal. Each disc consists of two concaved or cupped shaped sections 35 and 36 (Fig. 2) which are provided with perforations 37 and face each other making it possible for them to be secured together at their annular abutting edges 38, and provide a space 39 so as to facilitate the circulation of the treating medium through the disc during the treatment operation.

The discs 34 (Fig. 2) may be arranged to be positioned within the container in sequential order and while of the same external diameter, are provided with central openings 40 of varying diameters so as to enable the lower disc A being first positioned within the container and passing the upper shoulders 33c, 33b and 33a but being stopped by the widest shoulder 33, so as to be supported by the same at a point above the bottom of the container. The disc B immediately above the disc A may then be positioned within the container and the diameter of its central opening is such as to allow it to clearly pass the shoulders 33c and 33b but come to rest when it engages shoulder 33a. Disc C is then placed within the container and its central opening 40 is such as to allow it to pass the shoulder 33c but be engaged by the shoulder 33b. The disc D may then be slid on the tubular member 31 until its central opening abuts the shoulder 33c. While for the purpose of illustration, four partition members or discs have been shown associated with the perforated container, it will be manifest that this number may be varied and the distance between each adjacent disc may be made closer or wider than that shown. Any suitable heating and treating medium, such as steam, superheated steam, conditioned or unconditioned air or gases, may be introduced into the retort 11 from a suitable source of supply through one or more inlet pipes 41 (Fig. 2), each of which is provided with a hand or mechanical control valve 42. If air is used as the heating medium, it may be compressed and further hydrogenized or otherwise treated. As the container is spaced from the sides and bottom of the retort, it will be seen that the heating and treating medium is allowed to thoroughly circulate around the retort and contact with the carbonaceous material in the receptacle through the perforations in the container 11, tubular member 31 and partition members 34. Suitable pressure and thermostatically controlled valves 43 may communicate through the pipes 44 with the inside of the retort to provide means for allowing the escape of the steam, gases or vapors when the same reach a predetermined pressure or temperature. The retort 10 is made of any suitable heat resisting material such as brick, cement blocks, iron, steel and the like, and of such size and shape as the particular operating conditions may require. The bottom 28 of the retort has an outlet or drainpipe 45 for withdrawing the vaporized and unvaporized oils, gases, steam and liquids therefrom. A perforated strainer 45' positioned in the bottom of the retort may communicate with one end of the drainpipe 45 (Fig. 2). A T-fitting 46 is connected to the opposite end of the pipe 45 and has a liquid drainpipe 46' connected thereto and also a vapor and gas discharge pipe or branch 47'. A control valve 48' is connected to the pipe 45 and may be manually, electrically, or otherwise operated. The removable cover 12 is preferably provided with a reduced upwardly extending neck portion 47 having a central opening 48 in the top thereof with which communicates a discharge or condensing pipe 49 so as to withdraw the vaporized oils, evolved gases, and steam from the retort during the operation of the apparatus. Preferably within the neck 47 and secured to the wall of the opening 48 in any suitable manner, is a depending hollow strainer member 50 having perforations 51 and opened at its top so as to communicate with the pipe 49. An annular baffle member or flange 52 is secured to the outer wall of the member 50 and may be curved downwardly and spaced from the adjacent wall of the neck 47 so as to provide means for preventing or checking any expanding solid material that may be conducted to the neck 47 with the vaporized oils and gases, from escaping from the retort through the pipe 49. The baffle member 50 also prevents the discharge pipe 49 from becoming clogged with solid particles of material and which would substantially interfere with the free discharge of the oils and gases from the retort. A suitable pressure control valve 52' may be provided with a manually, thermostatically, or mechanically operating handle 53' so as to control the discharge of the steam, evolved gases, or vapors from the retort into the pipe 49. Thus, it will be seen that a simple, efficient and economical apparatus and method are provided for localizing predetermined batches of carbonaceous material within the container so as to obtain a uniform and equalized treatment of the material down to the small units of particles, and irrespective of whether the material is treated by steam, gas or vaporized chemicals which later may be subjected to a cooling operation. The pipe 47' is preferably connected to the pipe 49 so that the vapors and gases discharged from the bottom of the retort can mix with the vapors and gases withdrawn from the top of the retort through the pipe 49. The valve 48' controls the discharge of the vapors, gas and steam from the retort so that the vapors may be conducted through the pipe 47' and mixed with the vapor in the pipe 49 in order to insure a maximum yield from the retort, while the pipe 46' allows the liquids to be discharged or drained from the retort. Thus, it will be seen that means are provided for insuring the complete withdrawal of the vapors, gases and liquids from the retort during the treating operation. Moreover, the drainpipe 45 and its control valve 48' allows release of the vapors at the bottom of the retort which in treating certain carbonaceous materials is important, due to the fact that the gases of these materials begin to form first at the bottom of the retort, where they may be removed so as to mix with the evolved gases and vapors discharging through the top of the retort. Each of the valves 43 may communicate with the pipe 49 through the branch pipe 49' so as to insure collection of all of the evolved gases. The container 11 having therein the material to be treated, the tubular member 31 and the partition members 34, may be transported or conveyed into the retort or oven 10 by being in the form of a car or truck, and the retort 10 which may be of any size and shape may have one of its sides or its ends provided with a movable closure or door so that the container may be introduced into the retort to treat the material in substantially the same manner as previously described.

Where an especially compact and dense solid fuel is desired after the carbonaceous material has been processed for the removal of the oils, this can be accomplished by placing within each of the compartments, a solid disc or ponderous member 54' (Fig. 2) on the top of the raw material in each of the compartments so as to rest on the top of the same (Fig. 2) and before the next above compartment division disc is placed in position. While only one of these discs is shown, it will be understood that each compartment may be provided with such a weighted member to insure the formation of a compact and dense solid fuel.

In the modified form of the invention shown in Figures 4 and 5, the perforated container 53 is substantially similar to the container 11 previously described and is arranged to be removably mounted in the retort 10. However, instead of introducing the carbonaceous material into the container in separate substantially uniform batches, as previously described, the side of the container 53 is provided with vertically spaced openings 54, each of which is arranged to be closed by a door 55 hinged at one side as at 56 to the spaced pair of lugs 57 and having a handle 58 at its opposite end for opening or closing the door. A vertically and centrally disposed perforated tubular shaft 59 is removably mounted within the container 53 and has fixed thereon the axially spaced discs 60 for separating the interior of the container into vertically spaced compartments 61. The partition members or discs 60 are fixed to the shaft 59 so as to be bodily movable therewith and are so spaced that the compartments 61 register with complementary openings 54, so that the solid carbonaceous material may be introduced into the compartments when the doors 55 are open. The expansion of the material in each of the compartments is localized by not filling the compartments to their maximum capacity and allowing a space to be formed between the material and the disc immediately above the same in substantially the same manner as shown by the separate batches of material in Figure 2.

In processing and treating the raw carbonaceous material in accordance with the present invention, the material is introduced into the container 11 preferably at a point remote from the retort and where the pile of carbonaceous material is located. Initially, the removable tubular member 31 is positioned centrally and vertically within the container (Fig. 2) and then a batch of raw material M, in predetermined amount, is introduced into the container 11 and the partition member or disc A is then slidably mounted on the shaft 31 so as to be supported by the shoulder 33. It will be noted that the batch of material M is spaced from the adjacent partition member A. The batch of material N is then fed into the container so as to rest on the disc A. The disc B is then inserted in the container and supported by the shoulder 33a. The batch of material O is then fed into the container. Similarly, the batches of material P and Q may be introduced into the container and separated from each other by the discs C and D, respectively. When predetermined batches of the carbonaceous material are positioned within the compartments, the hooked arms 23 of the cable 21 are connected to the lugs 25 of the container 11 and the carriage 20 transports the container to a point above one of the retorts 10. The top 12 of the retort has previously been removed so that the container 11 with the raw material therein may be lowered into the retort so as to assume the position as shown in Figure 2. The cover 12 is then clamped to the retort and the separate batches of material in the compartments are properly positioned to be treated. It will be noted that the discs A, B, C and D separate the container into compartments that receive the individual batches of material but preferably the material does not completely fill each compartment or section. Thus, means are provided for localizing expansion of the solid carbonaceous material or products in each of the several compartments when processing and treating carbonaceous material such as coking-coals and the like. Moreover, the perforations or openings in the tubular member 32 and the discs 34 coact with the perforations in the container to insure maximum penetration of the heating medium such as steam, gas or air to and through the material. In Figure 2, as the shoulders supporting the discs are graduated in size, the discs will have to be removed and inserted in a predetermined order so that the disc having the largest central opening will rest on the lower shoulder 33 and the next smaller in size will rest on the shoulder 33a, and so on until the desired number of shoulders or compartments are built up in the container. Manifestly, the number of such compartments may be varied as the particular operating conditions may require. This novel shoulder arrangement provides simple, economical and efficient means for partially filling each compartment or section and for dumping the processed and treated solid product.

The evolved gases and vaporized oils escape from the top or other outlets of the retort through the member 50 into the discharge pipe 49 and the flange or shoulder 52 tends to prevent the clogging by any expanding solid materials that may reach the neck 47. The flange 52 is spaced from the adjacent wall 47 of the neck so as not to interfere with the free discharge of the evolved gases and oils. The pipe 49 may communicate through a swivel T-fitting 62 with an upwardly extending pipe 63 and a downwardly extending pipe 64 (Fig. 1). Thus, it will be seen that the vaporized oils and steam, as they are withdrawn from the retort through the pipe 49, condense on their way to the fitting 62 so that the evolved gas is withdrawn through the pipe 63 to a suitable point of discharge, while the pipe 64 conducts the condensed oils and steam which has now turned into oil or water to a container where the oils and water may be separated in any well known manner.

When the partitioning means shown in Figure 2 are used, after the processing operation is completed, the cover 12 is removed from the retort and the pipe 49 swung or moved to an out-of-the-way position, and the carriage 20 is then placed above the retort and the cable 21 lowered so that the spaced hooked arms 23 thereof engage the openings 24 in the lugs 25. The container 11 with the residual or treated material therein is then withdrawn from the retort and conveyed to a suitable point of discharge which removes the material, the tubular member 31 and discs 34 from the container so that the latter may be reused.

If the carbonaceous material is to be treated so as to produce a compact and dense solid fuel, each of the compartments may be provided with a solid disc or ponderous member 54' that rests on top of the material in each compartment which partially fills the same, thus providing means for insuring the obtaining of a compact and dense solid fuel after the oils, gases and tar acids have been removed from the carbonaceous material during the treating operation. The weighted disc or member 54' is used only when needed to control and compact such carbonaceous materials as have a tendency to expand under treatment.

When the container shown in Figure 4 is used, after completion of the heat treating operation of the material, the container may be withdrawn from the retort in substantially the same manner as the container shown in Figure 2, and as the discs 60 are fixed to the tubular member 59, these parts are withdrawn with the residual material and may bodily be removed therefrom at the point of discharge of the container from the carriage 20 in a similar manner to that previously described.

Thus, it will be seen that an improved method and efficient apparatus are provided for treating solid carbonaceous material such as industrial coal or other fuel, and in which means are provided for separating the material in a retort into batches and thoroughly subjecting these batches to equal distribution of heat and steam that passes quickly to all parts of the material to be treated so as to insure maximum yield of the evolved gases, vaporized oils, chemicals and other by-products. Manifestly, suitable strainers may be associated with the outlets from the retort similar to the strainers 50 and 45' for withdrawing the evolved vapors, gases, steams and liquids should the same be found necessary or advisable.

It will be understood that the form of apparatus and method employed are merely illustrative and in no sense restrictive, and that the scope of the invention is to be measured by the following claims.

I claim:
1. In combination with a retort for treating carbonaceous material, means for introducing a heating medium into the retort, a perforated container mounted in the retort and arranged to receive the material to be treated, means for spacing the container from the sides and bottom of the retort to provide space for facilitating the circulating of the heating medium from the retort into the container and through the material therein, a perforated tubular member vertically mounted within the container and provided with axially spaced partitions for dividing the container into separate compartments, each of said partitions including a pair of perforated members having a space therebetween and means for introducing the carbonaceous material in separate batches into the compartments so as to partially fill the same in order to localize treatment and expansion of the carbonaceous material during the heating treatment thereof.

2. In combination with a retort for treating carbonaceous material as called for in claim 1 in which each of the partition members is in the form of discs having an opposed pair of concaved shaped sides connected together and provided with openings for allowing the steam or vapor and the evolved gases to pass therethrough.

3. In combination with a retort for treating carbonaceous material, means for introducing a heating medium into the retort, a perforated container removably mounted in the retort and arranged to receive the material to be treated, means for spacing the container from the sides and bottom of the retort to provide a space for facilitating the circulating of the heating medium from the retort into and through the material in the container, a perforated tubular member vertically and centrally mounted within the container, spaced partitions slidably mounted on said tubular member, means for supporting the partitions on the tubular member so as to separate the interior of the container into compartments, each of said partitions including a pair of perforated members having a space therebetween means for introducing batches of carbonaceous material separately into the compartments so as to partially fill the same, and a cover detachably connected to the top of the retort.

4. In combination with a retort as called for in claim 3 in which the bottom of the retort is provided with a drain outlet for withdrawing the oils, vapors, gases and liquids, and means in said drain outlet for separating the vapors and gases from the liquid.

5. In combination with a retort for treating carbonaceous material, means for introducing a heating medium into the retort, a perforated container removably mounted in the retort and arranged to receive the material to be treated, means for spacing the container from the sides and bottom of the retort to provide a space for facilitating the circulating of the heating medium from the retort into and through the material in the container, a perforated tubular member vertically and centrally mounted within the container, spaced perforated discs slidably mounted on said tubular member, means for supporting the discs on the tubular member so as to separate the interior of the container into compartments, means for introducing batches of carbonaceous material separately into the compartments so as to partially fill the same, said compartment providing means for localizing expansion and the treatment of the material therein, a cover detachably connected to the top of the retort, said cover having a reduced neck provided with an outlet, a perforated hollow member extending into the outlet for withdrawing the evolved gases from the retort, and baffle means extending outwardly from the hollow member and spaced from the inner wall of said neck for preventing the clogging by solid particles of material of said outlet.

6. In combination with a retort for treating carbonaceous material as called for in claim 5 in which the bottom of the retort is provided with a drain outlet for withdrawing unvaporized oils and other liquids from the retort, and valve means for controlling the discharge of the oils through said drain outlet.

7. In combination with a retort for treating carbonaceous material as called for in claim 5 in which the bottom of the retort is provided with a drain outlet for withdrawing the oils, vapors, gases and liquids therefrom, means connected to said drain outlet for separating the vapors and gases from the liquid, and means for conveying the vapors and gases issuing from the bottom of the retort so as to mix with the gases issuing from the cover and said outlet.

8. In combination with a retort for treating carbonaceous material, means for introducing a heating medium into the retort, a perforated container removably mounted in the retort and arranged to receive the material to be treated, means for spacing the container from the sides and bottom of the retort to provide space for facilitating the circulating of the heating medium from the retort into the container and through the material therein, a perforated tubular member vertically and centrally mounted within the container, said tubular member being provided with axially spaced annular shoulders of progressively decreasing diameters, partitions axially slidable on the tubular member and having central openings of progressively increasing diameters so as to engage and be supported by one of said shoulders in order to separate the container into vertically spaced compartments, each of said partitions including a pair of vertically disposed perforated members having a space therebetween means for partially filling the compartment with carbonaceous material so that the top of the material in each compartment is spaced from the bottom of the adjacent upper partition in order to localize treatment and expansion of the carbonaceous material during the heating treatment and cooling of the solid products thereof and to facilitate the circulation of the heating medium through the carbonaceous material, and a cover detachably connected to the top of the retort.

9. In combination with a retort for treating carbonaceous material, means for introducing superheated steam into the retort, a perforated container removably mounted in the retort and arranged to receive the material to be treated, means for spacing the container from the sides and bottom of the retort to provide space for facilitating the circulating of the heating medium within the retort into and through the material in the container, a perforated tubular member vertically and centrally mounted in the container, means for partially filling each of the compartments with carbonaceous material so that the top of the material in each compartment is spaced from the bottom of the adjacent upper partition to localize expansion and treatment of the carbonaceous material during the heating treatment thereof, a cover detachably connected to the top of the retort, said cover having a reduced neck provided with an outlet, a perforated hollow member extending into the outlet for withdrawing the evolved gases and vaporized oils from the retort, baffle means extending outwardly from the hollow member and spaced from the inner wall of the neck for preventing the clogging by solid particles of material, and valve control means leading from the bottom of the retort for withdrawing vaporized and unvaporized oils, liquids and gases therefrom.

10. In combination with a retort for treating carbonaceous materials as called for in claim 9 in which means are provided for introducing superheated steam and gas at various temperatures into the retort.

11. In combination with a retort for treating carbonaceous material, means for introducing a heating medium into the retort, a perforated container insertable into the retort, a perforated tubular member mounted within the container, vertically spaced partitions dividing the container into separate compartments and supported by said tubular member, each of said compartments being partially filled with carbonaceous material prior to the introduction of the container into the retort, means for spacing the container from the sides and bottom of the retort, and each of said partitions including a pair of perforated members having a vertical space therebetween through which the treating medium passes to treat the separate batches of material in the compartments.

12. In combination with a retort for treating carbonaceous material, means for introducing a heating medium into the retort, a perforated container, a perforated tubular member vertically mounted within the container and provided with coaxially spaced partitions for dividing the container into separate compartments, each of said partitions including a pair of perforated members having a vertical space therebetween, said partitions constituting spaced supports for the material introduced therein prior to the positioning of the container into the retort, and means for spacing the container from the sides and bottom of the retort to provide spaces for facilitating the circulation of the heating medium into and through the container and the carbonaceous material therein, the material to be treated being arranged in separate batches in the compartments so as to partially fill the same in order to localize treatment and expansion of the material during the heating treatment thereof.

JOHN W. CLARK.

References Cited in the file of this patent
UNITED STATES PATENTS

| Number | Name | Date |
|---|---|---|
| 824,872 | Jewett | July 3, 1906 |
| 1,092,018 | Castonia | Mar. 31, 1914 |
| 1,710,070 | Records | Apr. 23, 1929 |
| 1,843,174 | Records | Feb. 2, 1932 |
| 2,161,014 | Brown | June 6, 1939 |
| 2,247,185 | Caccioppoli | June 24, 1941 |